United States Patent [19]

Tischer et al.

[11] Patent Number: 5,260,651
[45] Date of Patent: Nov. 9, 1993

[54] TRAVEL MEASURING SYSTEM FOR MEASURING A POSITION RELATIONSHIP OF ONE BODY RELATIVE TO ANOTHER BODY

[75] Inventors: Michael Tischer, Abstatt; Rene Schenk, Tamm, both of Fed. Rep. of Germany

[73] Assignee: Robert Bosch GmbH, Stuttgart, Fed. Rep. of Germany

[21] Appl. No.: 594,783

[22] Filed: Oct. 9, 1990

[30] Foreign Application Priority Data

Oct. 6, 1989 [DE] Fed. Rep. of Germany ....... 3933330

[51] Int. Cl.⁵ ...................... G01B 7/14; G01R 33/12; G01N 27/72
[52] U.S. Cl. .......................... 324/207.16; 324/207.22; 324/207.24; 340/870.31
[58] Field of Search ...................... 324/207.13, 207.15, 324/207.16, 207.22, 207.24, 219, 220, 221; 340/870.31; 280/707

[56] References Cited

U.S. PATENT DOCUMENTS

| | | | |
|---|---|---|---|
| 2,967,994 | 1/1961 | Peterson | 324/221 |
| 3,513,408 | 5/1970 | McGee | 324/207.16 |
| 4,406,999 | 9/1983 | Ward | 324/207.15 |
| 4,502,006 | 2/1985 | Goodwin et al. | 324/207.16 |
| 4,510,371 | 4/1985 | Nakamura et al. | |
| 4,674,767 | 8/1988 | Ichikawa et al. | 324/207.22 |
| 4,717,874 | 1/1988 | Ichikawa et al. | 324/207.16 |

FOREIGN PATENT DOCUMENTS

| | | |
|---|---|---|
| 0027308 | 4/1981 | European Pat. Off. |
| 10407 | 1/1880 | Fed. Rep. of Germany |
| 903273 | 7/1949 | Fed. Rep. of Germany |
| 1023945 | 2/1958 | Fed. Rep. of Germany |
| 2842140 | 4/1980 | Fed. Rep. of Germany |
| 3116378 | 11/1982 | Fed. Rep. of Germany |
| 3347052 | 7/1985 | Fed. Rep. of Germany |
| 3526675 | 3/1986 | Fed. Rep. of Germany |
| 3500121 | 7/1986 | Fed. Rep. of Germany |
| 3703867 | 8/1988 | Fed. Rep. of Germany |
| 3730701 | 3/1989 | Fed. Rep. of Germany |
| 2620222 | 3/1989 | France |
| 0892197 | 12/1981 | U.S.S.R. ......................... 324/207.24 |
| 2132771 | 7/1984 | United Kingdom |

OTHER PUBLICATIONS

Patents Abstracts of Japan, Mar. 29, 1988, vol. 12, No. 95-JP 62-229002.
Patents Abstract of Japan, Jun. 11, 1988, vol. 12, No. 203-JP 63-5201.
Patents Abstracts of Japan, Jan. 12, 1988, vol. 12, No. 8-JP 62-168001.
Patents Abstracts of Japan, May 14, 1987, vol. 11, No. 14 JP-61-283801.
Patents Abstracts of Japan, Nov. 7, 1986, vol. 10, No. 327 JP-61-134601.
Patents Abstracts of Japan, Oct. 14, 1986, vol. 10, No. 30-JP 61-117401.
Patents Abstracts of Japan, Mar. 2, 1982, vol. 6, No. 34-JP 56-153202.
Patents Abstracts of Japan, Sect., vol. 12, 1988, No. 339-JP 63-98501.
Patents Abstracts of Japan, Mar. 23, 1988, vol. 12, No. 88-JP 62 222103.

Primary Examiner—Walter E. Snow
Attorney, Agent, or Firm—Edwin E. Greigg; Ronald E. Greigg

[57] ABSTRACT

The travel measuring system serves to detect a control position of one body relative to another body. Disposed on one of the bodies is a coil and a structured material that influences the inductance of the coil is disposed on the other body. The influence of the material varies along a travel distance to be measured. This serves to ascertain the control position. The travel measuring system according to the invention may be used in a shock absorber to ascertain a stroke.

29 Claims, 4 Drawing Sheets

TRAVEL MEASURING SYSTEM FOR MEASURING A POSITION RELATIONSHIP OF ONE BODY RELATIVE TO ANOTHER BODY

BACKGROUND OF THE INVENTION

The invention relates to a travel measuring system, for detecting a control position of one body relative to another, as defined hereinafter. A travel measuring system is already known in which one part of the system is connected to one of the bodies and another part of the system is connected to the other body, and the control position of one body relative to the other can be measured.

The known travel measuring system is a so-called inductive travel measuring system. One part of the system includes an armature, which is preferably of soft iron, and the other part of the system includes a coil. The coil must be markedly longer than a travel distance to be measured, and the armature must likewise be markedly longer than the travel distance. The result is a travel measuring system having a very long total length. The coil plus the armature are more than twice as long as the travel distance to be measured. The armature influences an inductance of the coil. The inductance of the coil can be used as a standard for the control position of the one body relative to the other. The farther the armature plunges into the coil, the greater does the inductance of the coil become.

In another known travel measuring system, the coil is moved relative to an electrically conductive material. The more the coil plunges into the electrically conductive material, the lower does the inductance of a coil become. Once again, the inductance of the coil is a standard for the control position of one body relative to the other. Openings spaced mutually apart may be provided in the electrically conductive material. Once again, the coil and the electrically conductive material must be longer than the travel distance to be measured. The result is a considerable physical length, which in the extended state is markedly more than twice as long as the travel distance to be measured.

Accordingly, both known travel measuring systems are substantially longer physically, particularly in the extended state, than the travel distance to be measured, so that only in the rarest cases is it possible to build the known travel measuring systems into a cylinder, particularly a cylinder of a shock absorber.

OBJECT AND SUMMARY OF THE INVENTION

The travel measuring system of the generic type described above has the advantage over the prior art that very special influencing of the coil takes place at any point of the structured material that influences the inductance. Along the travel distance, each point of the material having the structure affects the coil differently, in a characteristic way. This influence is a standard for the control position.

If the coil is markedly shorter than the measurement zone, then a particularly short travel measuring system is obtained, which is particularly easy to install in a cylinder, particularly in a shock absorber. Because of the travel measuring system according to the invention, the cylinder is advantageously no larger, or virtually no larger, than one which does not include a travel measuring system.

If the material having the structure is located on a substrate material that does not affect the influencing of the coil by the material having the structure, or affects it only a little, the result is that the cylinder is particularly simple to manufacture, and its strength is not affected by the travel measuring system.

If the material forming the structure is a particularly highly electrically conductive material, then particularly high measurement sensitivity of the travel measuring system is advantageously obtained if a further material, which has particularly high permeability, is disposed on the side remote from the coil of the material having the structure.

If the measuring coil includes at least two axially spaced coils through which current flows in opposite directions, this has the advantage that even a very strong external magnetic field or external electrical field has no influence, or virtually no influence, on the outcome of measurement attained via the measuring coil. Even a change of the intensity of the field acting on the measuring coil from outside has no influence on the outcome of measurement.

The partition between the two coils advantageously assures that the magnetic field of one coil will not negatively influence the magnetic field of the other, or at most will affect it insignificantly.

The travel measuring system proposed is a measuring system that advantageously furnishes an absolute value at all times.

The invention will be better understood and further objects and advantages thereof will become more apparent from the ensuing detailed description of a preferred embodiment taken in conjunction with the drawing.

DESCRIPTION OF THE PREFERRED EMBODIMENT

The travel measuring system according to the invention can be used in equipment in which a control position of one body relative to another body is to be detected. A predetermined inductance in a coil and this predetermined measurement signal is obtained depending on the control position of the one body relative to the other. A predetermined measurement signal is assigned to each control position. By evaluating these measurement signals, it can for instance be ascertained how much one of the bodies has traveled relative to the other. A relative speed between the two bodies can be detected as well.

Although not limited to this alone, in the exemplary embodiment of the present patent application, a shock absorber has been selected as an example of the application of the travel measuring system according to the invention.

Figure 1:
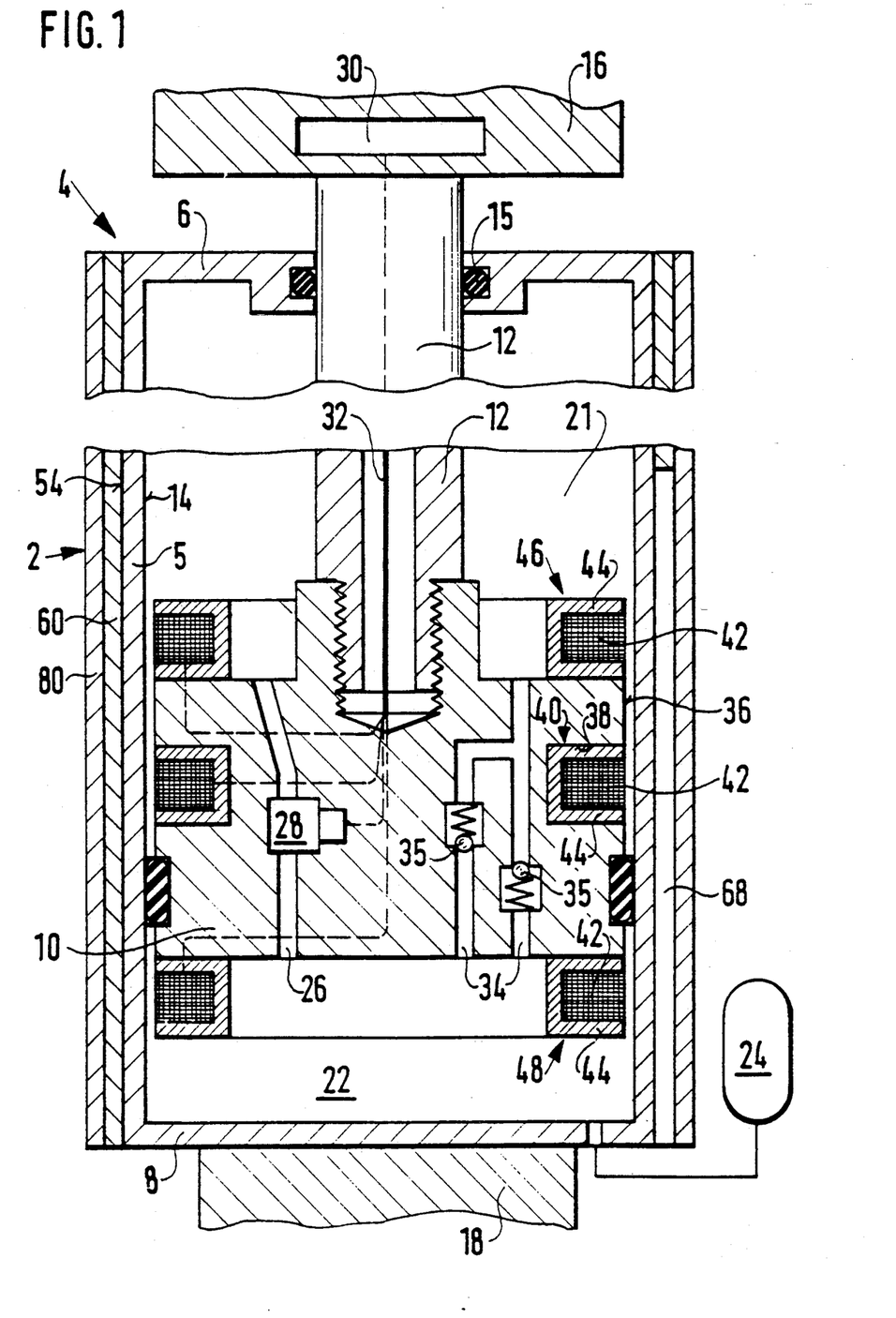
FIG. 1 shows the preferred exemplary embodiment.

The exemplary embodiment shown in the drawing has a so-called single-tube shock absorber 2. For the sake of simplicity, a middle section of the shock absorber 2 has been left out. The shock absorber 2 substantially includes a cylinder 4, having a jacket 5, a first face end 6 and a second face end 8, and a damper piston 10 and a piston rod 12. The damper piston 10 is axially displaceably supported inside the cylinder 4 along an inner jacket face 14 of the jacket 5. The piston rod 12 is connected by one end to the damper piston 10 and with its other end protrudes through the first face end 6, past the cylinder 4. A seal 15 provided on the first face end 6 seals off a leakage gap between the face end 6 and the piston rod 12. The end of the piston rod 12 protruding axially past the cylinder 4 is connected to a first mass 16. The second face end 8 of the cylinder 4 is pivotably connected to a second mass 18. The first mass 16 by way of illustration comprises a vehicle body, for instance, and the second mass 18 is the axle of that vehicle, for instance. The interior of the cylinder 4 is divided by the damper piston 10 into a first work chamber 21 and a second work chamber 22. The first work chamber 21 is located on the side of the damper piston 10 toward the first face end 6, and the second work chamber 22 is disposed on the side of the damper piston 10 oriented toward the second face end 8. In the drawing, the first work chamber 21 is located above the damper piston 10, and the second work chamber 22 is located below it. To compensate for differences in volume as the piston rod 12 is extended and retracted, the second work chamber 22 can for instance communicate with a reservoir 24. Both work chambers 21, 22 and the reservoir 24 are filled at least partially with a pressure medium.

The two work chambers 21, 22 communicate with one another via at least one hydraulic connection 26. An electrically triggerable magnet valve 28 may for instance be provided in the hydraulic connection 26. Via the magnet valve 28, the throttling of the pressure medium as it flows through the hydraulic connection 26 can be influenced. The magnet valve 28 is connected via a line 32 with an electronic system 30 provided in the first mass 16 and is triggerable via the electronic system 30. In addition to the hydraulic connection 26, or instead of it, further hydraulic connections 34 may be provided for connecting the two work chambers 21, 22. Check valves 35 can for instance be provided within the further hydraulic connections 24. The hydraulic connection 26 and the further hydraulic connections 34 are disposed inside the damper piston 10, in the exemplary embodiment shown. The core 44 markedly improves the action of the measuring coil 40.

An annular groove 38 is provided on an outer jacket 36 of the damper piston 10. A measuring coil 40 is located inside the annular groove 38. The measuring coil 40 includes a coil 42 and a core 44. The core 44 comprises a soft-magnetic and highly permeable material, for example, and largely encompasses the coil 42, but it leaves the coil 42 free at an outer circumference oriented toward the jacket 5. The coil 42 preferably comprises an electrically conductive wire that is insulated, being wrapped in a plurality of layers. The coil 42 is likewise connected to the electronic system 30 via a line 32. The description of the measuring coil 40 therefore applies to the other measuring coils 46, 48 as well.

In addition to or instead of the measuring coil 40, some other measuring coil 46 or a measuring coil 48 may also be provided. The other measuring coil 46 is disposed on the damper piston 10, on the face end toward the first work chamber; the other measuring coil 48 is disposed on the face end of the damper piston 10 toward the second work chamber 22. The measuring coils 46, 48 likewise include a coil 42 and a core 44. For the travel measuring system according to the invention, one coil 42 and hence one of the measuring coils 40, 46, 48 is in principle sufficient, and the measuring coil 40, 46, 48 is to be disposed as favorably as possible, depending on existing conditions.

The jacket 5 of the cylinder 4 has an outer jacket face 54. A material 60 that influences an inductance of the coil 42 is disposed on the outer jacket face 54 of the cylinder 4. If the jacket 5 and the material 60 that affects the inductance are imagined to be separated along a jacket line 65, and if the jacket 5 and the material 60 are then imagined to be spread out in one plane, the result would be a rectangle with four sides (FIGS. 2-5). Two parallel sides 65 are equivalent to the jacket line 65 at which the imaginary division of the material 60 influencing the inductance and the jacket 5 was made. The third side 6 of the rectangle is equivalent to the first face end 6, and the fourth side 8 is equivalent to the second face end 8. The jacket 5, shown in a developed view, forms the rectangle and is shown in dashed lines in FIGS. 2-8. In FIGS. 2-8, the material 60 that influences the inductance of the coil 42 and is shown in solid lines rests on the jacket 5, which is shown in a plane. In all the drawing figures, elements that are the same or function the same are identified by the same reference numerals.

Figure 2:
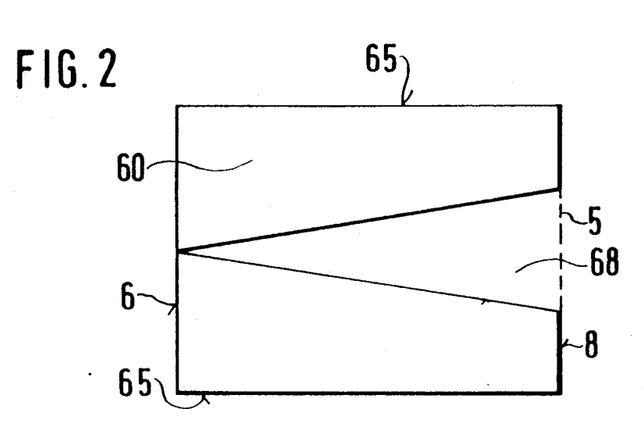
FIGS. 2-8 each show one particularly advantageous embodiment of the material having the structure.
Figure 3:
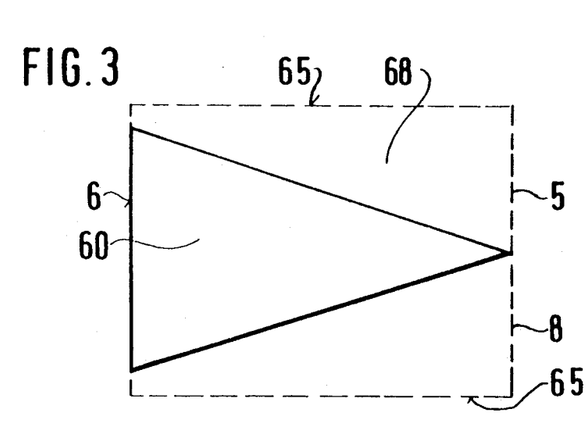
Figure 4:
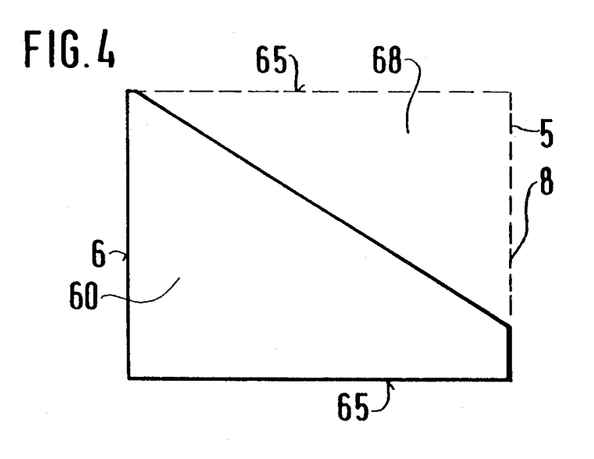
Figure 5:
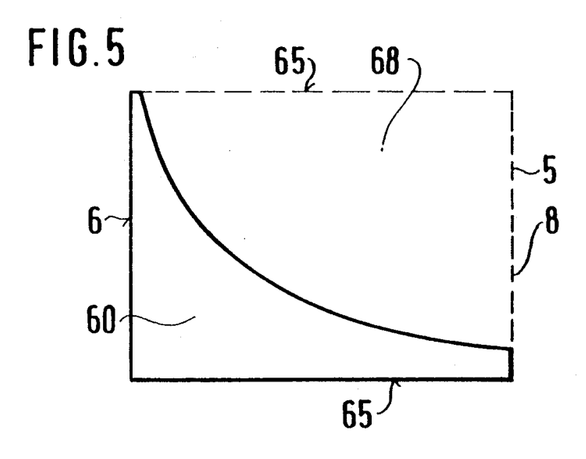
Figure 6:
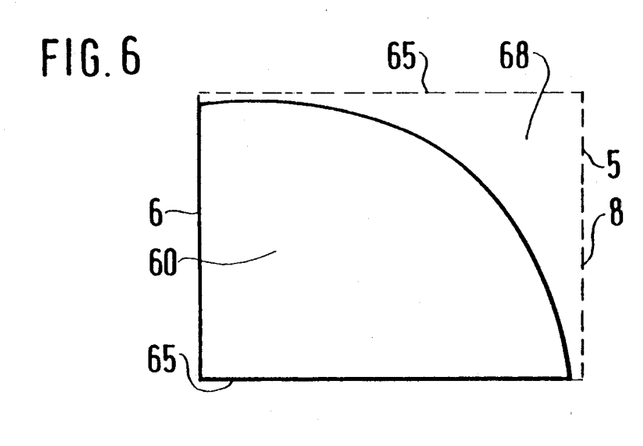

The material 60 influencing the inductance is not a complete rectangle; instead, it includes a variably large opening 68, or a plurality of openings 68. In FIG. 2, the opening 68 begins at the second face end 8 and extends axially in the shape of a wedge into the material 60. In other words, the material 60 that influences the inductance is absent on the jacket face 54 of the cylinder 4 in the region of the opening 68. In the region of the first face end 60, the material 6 completely surrounds the cylinder 4. Toward the second face end 8, the opening 68 in the material 60 becomes wider and wider, and the material 60 becomes narrower and narrower. The situation is the same in FIGS. 3-7. In FIG. 2, the material 60 completely encompasses the jacket 5 of the cylinder 4 in the region of the first face end 6. In FIG. 3, the material 60 which influences the inductance is narrow enough that it does not completely surround the cylinder 4 in the vicinity of the first face end 6. FIG. 4 is largely equivalent to FIG. 2, but the imaginary jacket lines 65 are laid out differently in two drawing figures. In FIGS. 2-4 and 7, there is a rectilinear edge, or edges, between the material 60 which influences the inductance and the opening 68. As FIGS. 5 and 6 show, the edge need not necessarily extend rectilinearly but can be suitably curved instead. Depending on whether the sensitivity of the travel measuring system is to be greater in the vicinity of the first face end 6 or in the vicinity of the second face end 8, a version either according to FIG. 5 or according to FIG. 6 will be preferred. For most applications of the travel measuring system according to the invention, it will be particularly suitable for the edge between the material 60 influencing the inductance and the opening to extend in such a way that the inductance of the measuring coil 40 varies linearly over the entire measuring curve. For this purpose, a curved edge is required.

Figure 7:
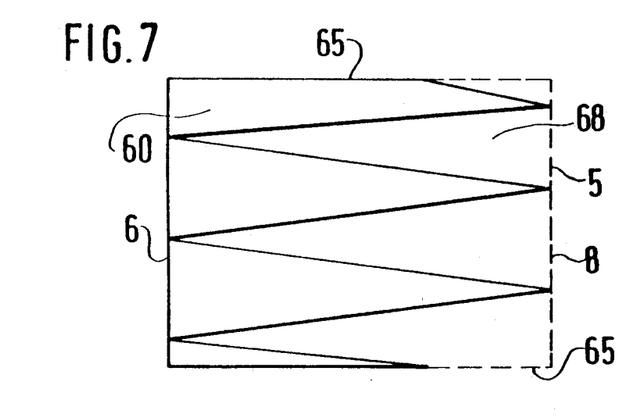
Figure 8:
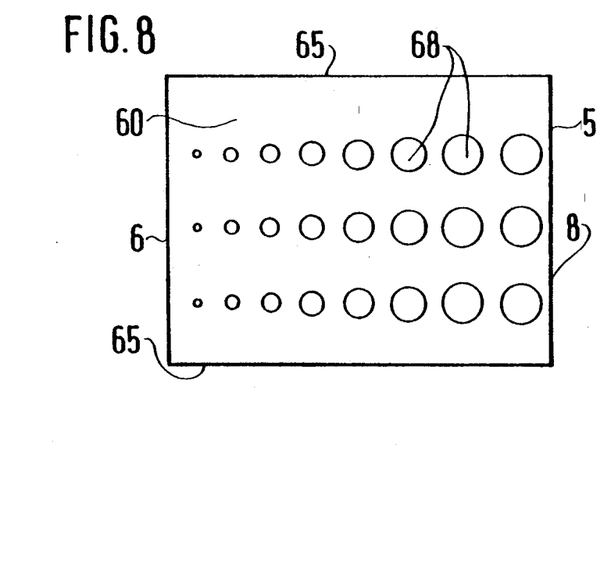

It is also possible to provide a plurality of openings 68 in the material 60 that influences the inductance, as FIGS. 7 and 8 show. FIG. 8 is particularly advantageous if individual increments are to be measured with the travel measuring system of the invention.

In the axial direction, that is, in the direction of a travel distance to be measured, the measuring coil 40 is substantially shorter than a maximum possible measuring zone. The material 60 influencing the inductance extends over at least the entire measuring zone. The influencing material 60 is shown in FIGS. 2-8 such that there is more material 60 in the region of the first face end 6, and less material 60 in the region of the second face end 8. Depending on the control position of the measuring coil 40 or the coil 42 relative to the cylinder 4, the influence of the material 60 is greatly variable. The influence on the measuring coil 40, or in other words on the coil 42, of the inductance-influencing material 60 is an exact standard for the control position of the measuring coil 40 or coil 42 relative to the material 60.

The following selection of materials is highly advantageous: The material 60 which influences the inductance and having the structure is for instance a material that has good electrical conductivity but is not magnetic, or has low permeability. Copper or aluminum, for instance, is highly suitable for the material 60. It is particularly practical if at least in the measuring zone, the material used for the jacket 5 is a poor electrical conductor and nonmagnetic, as are some high-alloy steels, for instance. In that case, the inductance of the measuring coil 40 or coil 42 is relatively high if the coil is located in the region of the second face end, and relatively low if it is located in the region of the first face end 6. Since the opening 68 in the material 60 that influences the inductance varies continuously along the travel distance to be measured, any arbitrary intermediate control position can be detected. In FIG. 8, an incremental resolution is effected.

Another highly advantageous selection of materials is the following: It is also an option to select a soft-magnetic material for the material 60 which influences the inductance, in other words a material having high permeability, that at the same time is a poor electrical conductor, as is the case in a number of magnetic materials. Once again it is favorable to fabricate the jacket 5 of the cylinder 4 from a material having poor electrical conductivity that is also not very magnetic or is nonmagnetic. In that case, the inductance of the coil 42, that is, of the measuring coil 40, is relatively low when it is located in the region of the second face end 8, and it increases continuously the farther it moves toward the face end 6. Once again, the structured material 60 that influences the inductance is embodied for instance as shown in FIGS. 2-8.

Figure 9:
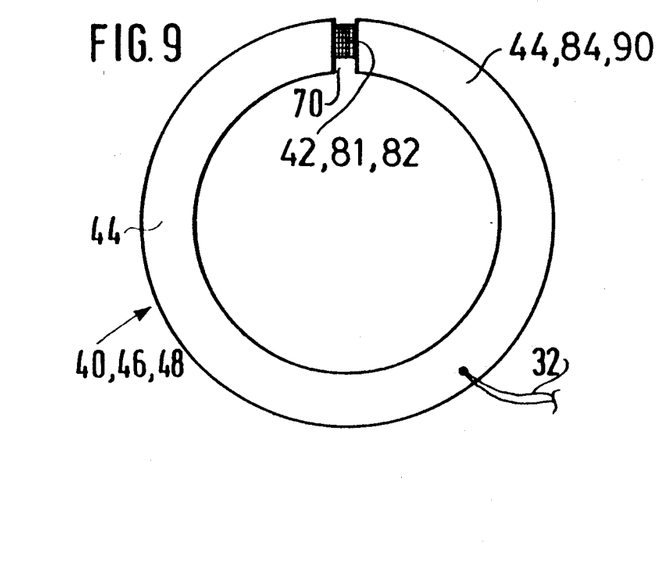
FIG. 9 shows a particularly advantageous embodiment of a coil with core.

FIG. 9 shows only one of the measuring coils 40, 46, 48 with the core 44 and the coil 42. An end view on the measuring coil 40, 46, 48 and part of the line 3 is shown. FIG. 9 shows a particularly advantageous embodiment of the measuring coil 40, 46, 48. Here, the core 44 is not a closed ring, but instead has a slit 70 at some arbitrary point. The slit 70 extends transversely through the annular core 44 at one end. The slit 70 may be relatively narrow. The core 44 is preferably of a highly permeable, soft-magnetic material. With the slit 70, the flow of electrical currents in the circumferential direction in the core 44, or of eddy currents, is effectively prevented. This makes the influence on the measuring coil 40 of the material 60 influencing the inductance particularly intensive.

Optionally a further material 80 (FIG. 1) is disposed on the side of the material 60 away from the measuring coil 40 which influences the inductance of the measuring coil 40. A very particularly suitable measuring effect is obtained if the structured material 60 has particularly good electrical conductivity with low permeability, and if the further material 80 is a material having high permeability. If the measuring coil 40 or coil 42 is located in the region of the first face end 6, then the inductance of the coil 42 is substantially influenced by the structured material 60. Since the structured material 60 has good electrical conductivity, this material 60 attenuates the inductance of the coil 42. If the coil 42 is moved from the first face end 6 toward the second face end 8, then the influence of the structured material 60 becomes less, and the influence of the further material 80 becomes greater, because the opening 68 in the structured material 60 is widening. Because of eddy currents in the structured material 60, the highly permeable material 80 can influence the inductance of the coil 42 or measuring coil 40 only in the region of the opening or openings 68 in the structured material 60. If the further material 80 is present, then two effects are added together. In the region of the first face end 6, the inductance of the measuring coil 40 or coil 42 is reduced, and in the region of the second face end the inductance of the coil 42 is increased. The result is a particularly good measurement effect. To prevent the opening 68 in the structured material from forming a void between the cylinder 4 and the further material 80, the opening 68 may for instance be filled with a resin.

The structured material 60 may be a tube, for instance, that is slipped over the jacket 5 of the cylinder 4 and is provided with the opening or openings 68. The structured material 60 may, however, also be a metal sheet shaped in accordance with FIGS. 2-8 and wrapped at least partway around the cylinder. On the other hand, the structured material 60 may also be electrolytically deposited on the cylinder 4, for example. Any other coating process is also possible. The jacket 5 serves as substrate material for the structured material 6.

The structured material 60 also may be disposed on the inside jacket face 14 of the cylinder 4. However, disposing structured material 60 on the outer jacket face 54 has the advantage that the inner jacket face 14 may be embodied in the usual manner and will not form a step here, which could lead to problems in terms of sealing between the damper piston 10 and the cylinder 4. The presence of the jacket 5 of the cylinder 4 between the measuring coil 40 and the structured material 60 has the advantage that the opening 68 can be embodied arbitrarily, without the ability of having any influence whatsoever on the strength of the shock absorber 2. This is important, because very considerable pressures sometimes arise inside a shock absorber.

The measuring coil 40 and thus the coil 42 are a component of one body, and the structured material 60 that influences the inductance of the coil 42, and if present the further material 80 influencing the inductance as well, are components of the other body.

It is also possible for the structured material 60 and the further material 80 to be disposed on or inside the piston rod 12, and for the measuring coil 40 to be disposed on the first face end 6 in the region of the seal 15, for example. These are equivalents, however, and so these variants will not be described in detail.

It is particularly advantageous that depending on the disposition of the measuring coil 40, a line 32 needs to be extended to only one of the two bodies movable relative to each other. In the travel measuring system according to the invention, a magnetic field that does not belong to the travel measuring system, such as the magnetic field of the magnet valve 28, has no influence or virtually no influence on the coil 42, particularly because of the especially skillful embodiment of the core 44 that partially envelops the coil 42.

There are various options for measuring the inductance of the measuring coil 40, or of the coil 42. For instance, the coil 42 can be supplied with a constant voltage at relatively high frequency, and the current flowing through it can be measured. This current is a standard for the inductance of the coil 42 and thus for the control position of one body relative to the other, or in the present case for the control position of the damper piston 10 relative to the cylinder 4. The control position of the damper piston 10 is an important standard for triggering the magnet valve 28, for instance. The hydraulic connection 26 with the magnet valve 28 can extend inside the damper piston 10, or else the hydraulic connection 26 or 34 can join the two work chambers 21, 22 to one another outside the damper piston.

It is also possible for the structured material 60 to be fabricated from a material that is a good electrical conductor but is as much as possible nonmagnetic, for instance, and instead of the opening 68 to provide a material inside the opening 68 that is a poor electrical conductor but is highly permeable. the result is approximately the same measuring effect as with the further material 80.

The length of the measuring coil 40, or coil 42, in the direction of motion is advantageously markedly shorter than the measuring zone. The structured material 60 having the opening 68 or openings 68 and optionally the material 80 is advantageously long enough in the direction of motion that in no control position does the magnetic field originating at the measuring coil 40 extend more than insignificantly past the two end regions of the material 60, 80. The spacing between the coil 42 and the material 60, 80 should be such that the magnetic field of the coil 42 is still intersected in such a manner that it is evaluatable by measuring instruments. A small spacing is particularly favorable. On the other hand, because of the good measuring outcome attainable, the spacing need not be unusually small; this is very advantageous for simple manufacture of the entire shock absorber.

Figure 10:
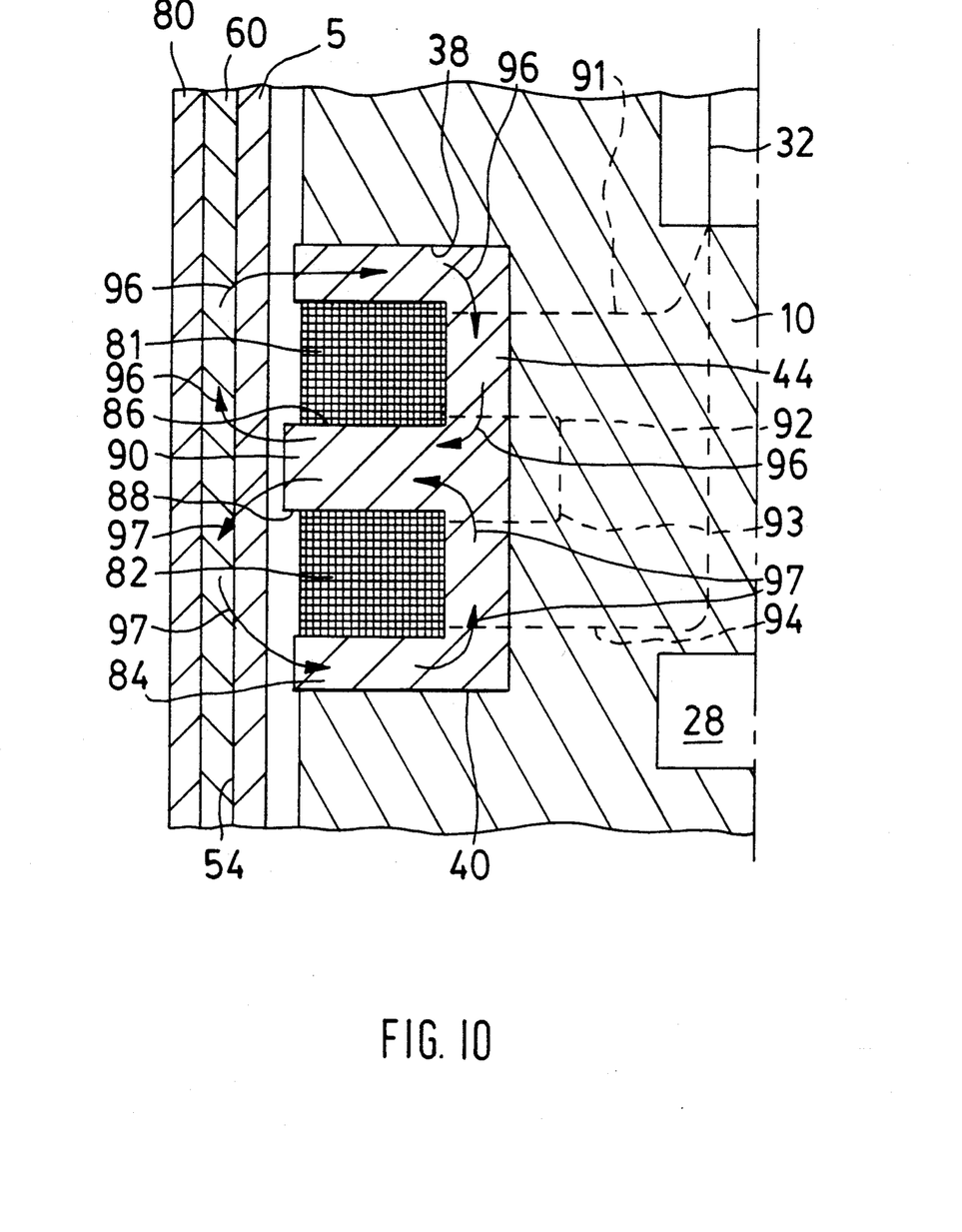
FIG. 10 shows a particularly advantageously embodied measuring coil in cross section.

FIG. 10 shows another particularly advantageous embodiment of the measuring coil 40. FIG. 10 shows a detail of the shock absorber of FIG. 1, on a different scale. Except for the measuring coil 40, the other elements are the same as in the exemplary embodiment shown in FIG. 1.

In FIG. 10, the measuring coil 40 substantially includes a first coil 81, a second coil 82 and a core 84. A first notched area 86 and a second notched area 88 are provided on the core 84. The first coil 81 is located inside the first notch 86, and the second coil 82 is located inside the second notch 88. A partition 90 is formed between the two coils 81, 82. The partition 90 and the core 84 are preferably a single component and comprise the same material as that discussed above for the core 44. However, the partition 90 may also be a separate component and may be introduced between the two coils 81, 82. The partition 90 should be closely connected to the core 84. The partition 90 is a component of the core 84. The core 84 and the partition 90 largely surround the coils 81, 82, but leave the coils 81, 82 free on the outer circumference oriented toward the jacket 5. The coils 81, 82 are largely the same in structure as the coil 42.

The coils 81, 82 preferably comprise an electrically conducting wire, wrapped with multiple-layer insulation. Each wire has one upper end 91, 93 and one lower end 92, 94, upper and lower being with respect to FIG. 10. The coils 81, 82 are connected such that current flows through them in opposite directions. This can be attained for instance by winding the wire of the first coil 81 in one circumferential direction, beginning at the upper wire end 91 of the first coil 81, then joining the lower wire end 92 of the first coil 81 to the upper wire end 93 of the second coil 82, and then winding the wire of the second coil 82 in the opposite circumferential direction. The two wire ends 91, 94 are connected to the electronic system 30.

If both coils 81, 82 are wound in the same direction of rotation, then once again it is possible for the two coils 81, 82 to have current flowing in opposite directions through them if the upper wire ends 91, 93 are for instance connected to the electronic system 30 and the lower wire end 92 of the first coil 81 is connected to the lower wire end 94 of the second coil 82. Since this variant differs only slightly from the embodiment shown in FIG. 10, it is not shown in a separate drawing figure.

The two coils 81, 82 are quite close together in terms of the measuring travel, so that the measuring coil 40 can be considered to be a single unit, even though it includes the two coils 81, 82.

If the travel measuring system is installed in a shock absorber, for instance, the space available there is often quite limited, and it is usually impossible to completely prevent some magnetic or electrical fields from acting upon the measuring coil 40. Such fields may originate in the magnetic zone 28, for example. Despite the core 44 shown in FIG. 1, these fields can more or less induce a voltage in the coil 42 and can also influence the electrical current flowing through the coil 42. To the extent that these fields cannot be adequately shielded with the aid of the core 44, they have a negative influence on the outcome of measurement. The electronic system 30 cannot distinguish between a displacement of the measuring coil 40 or an external field as a cause for a change in the voltage or current in the coil 42.

Even in the exemplary embodiment shown in FIG. 10, the externally prevailing magnetic or electrical fields can act on the coils 81, 82. Since the two coils 81, 82 are located quite close together, it can be assumed that both coils 81, 82 are influenced by a magnetic or electrical field of the same intensity. Since the current through the two coils 81, 82 is in opposite directions, the effect of this is as follows: If the external field is such that an amplification occurs in the first coil 81, then an equally large attenuation of the measurement signal necessarily occurs in the second coil 82. This has the advantage that a magnetic or electrical field of whatever intensity acting externally upon the measuring coil 40 has no influence on the outcome of measurement. Even a rapid change in the magnetic or electrical field, for instance when the magnet valve 28 is switched, still has no influence on the outcome of measurement.

The partition 90 preferably likewise comprises a soft magnetic, highly permeable material. Since the first coil 81 is partitioned off from the second coil 82 by the partition 90, the first coil 81 can develop its full action, without the magnetic field of the second col 82 significantly reducing the action of the first coil 81. The situation is the same for the second coil 82, the effectiveness of which is not reduced by the first coil 81, because of the partition 90. A particularly favorable embodiment is attained if the partition 90 is selected to be thin enough that the two coils 81, 82 are as close as possible together, yet on the other hand if the partition 90 is made thick enough that the magnetic saturation of the partition 90 is not exceeded, so that the two magnetic fields of the two coils 81, 82 do not cancel one another out, or at least do not do so to an interfering extent. The partition 90 can be made all the more thinner, the more strongly its material can be magnetized. The permeability factor of this material should be adequately high.

Four arrows 96 and four arrows 97 are shown in FIG. 10. The arrows 96 symbolize the magnetic field of the first coil 81 and by way of example they rotate clockwise in FIG. 10. The arrows 97 symbolize the magnetic field of the second coil 82, and they rotate counterclockwise. The result is the advantageous effect that both magnetic fields extend in the same direction in the vicinity of the partition 90.

The two coils 81, 82 shown in FIG. 10 are in series, that is, connected in line with one another, and together have approximately the same effect as the coil 42 shown in FIG. 1, if the two coils 81, 82 together have the same length of wound wire as the one coil 42. In other words, with reference to a useful signal, the two coils 81, 82 have approximately the same effect, as long as together they have the same length of wound wire as a single coil 42. In terms of their ability to be influenced by interfering external electrical or magnetic fields, the embodiment of the measuring coil 40 shown in FIG. 10 is more favorable than that of the measuring coil 40 shown in FIG. 1.

It is also possible to provide the measuring coil 40 with an additional third coil or still further coils. It is best to preclude the influence of interfering external fields by dimensioning the coils such that the internal magnetic fields each rotate half in one direction and half in the other.

The core 84 and partition 90 shown in FIG. 10 may also be interrupted at some arbitrary point by the slit 70 as shown in FIG. 9. The slit 70 extends on one side transversely through the annular core 84 and through the annular partition 90. In this case again, because of the interruption by the slit 70, the flow of electrical currents in the circumferential direction in the core 84 and partition 90 is effectively prevented.

To the extent that nothing different has been said in the description of FIG. 10, the same description as given above for the measuring coils 40, 46, 48 shown in FIGS. 1 and 9 applies to the measuring coil 40 shown in FIG. 10. Unless otherwise noted, the same description applies to the coils 81, 82 as to the coil 42, and the description of the core 44 is equally applicable to the core 84 having the partition 90.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A travel measuring system for an apparatus, in particular an apparatus having a cylinder, with two bodies displaceable relative to one another for detecting a control position of one body relative to the other body, one of the bodies includes a single measuring coil (40), which is markedly shorter in a direction of motion than a measuring zone in the direction of motion, and the other body is provided with at least one influencing material (60) that influences the inductance of the measuring coil, said at least one influencing material (60) is disposed on a side (54) of a basic material (5) facing away from the measuring coil (40) and extends over the entire measuring range with a continuous increasing width equidistant along its length from said measuring coil as said coil moves along the length of said influencing material, the influencing material (60) has, in the direction of motion, a structure representing the control position, having at least one linear variable width recess (68) such that upon displacement of the two bodies relative to one another, an overlap between the measuring coil (40) and the at least one influencing material (60) influencing the inductance is varied such that each control position is associated with a predetermined overlap that especially characterizes that control position.

2. A displacement measuring system comprising an apparatus, having two bodies displaceable relative to one another, said apparatus further adapted to detect a control position of one of said bodies relative to the other body, wherein one of the bodies includes a single position measuring coil mounted thereon and the other body is provided with at least one inductance influence material (60) with a continuous increasing width and spaced from said coil for influencing an inductance of the position measuring coil, said at least one inductance influencing material is equidistant along its length from said position measuring coil as said position measuring coil moves along a length of said inductance influencing material, a further inductance influencing material (80) is disposed on a side of said at least one influencing material (60) remote from the inductance measuring coil (40), the at least one inductance influencing material (60) has a markedly greater conductivity and a markedly lesser permeability than said further inductance influencing material (80), and the at least one inductance influencing material (60) has a variable width recess structure in a direction of motion that represents the control position.

3. A travel measuring system as defined by claim 2, in which the at least one influencing material (60) has a high electrical conductivity.

4. A travel measuring system as defined by claim 2, in which the influencing material (60) has a high magnetic permeability.

5. A travel measuring system as defined by claim 2, in which the measuring coil (40) includes at least two coils (81, 82) through which current flows in opposite directions.

6. A travel measuring system as defined by claim 3, in which the measuring coil (40) includes at least two coils (81, 82) through which current flows in opposite directions.

7. A travel measuring system as defined by claim 4, in which the measuring coil (40) includes at least two coils (81, 82) through which current flows in opposite directions.

8. A travel measuring system as defined by claim 5, in which a partition (90) for separating the two coils (81, 82) is provided on a core (84).

9. A travel measuring system as defined by claim 8, in which a partition (90) comprises magnetizable material.

10. A travel measuring system as defined by claim 2, in which the measuring coil (40) is markedly shorter in the direction of motion than a measuring zone in the direction of motion.

11. A travel measuring system as defined by claim 3, in which the measuring coil (40) is markedly shorter in 11. the direction of motion than a measuring zone in the direction of motion.

12. A travel measuring system as defined by claim 4, in which the measuring coil (40) is markedly shorter in the direction of motion than a measuring zone in the direction of motion.

13. A travel measuring system as defined by claim 5, in which the measuring coil (40) is markedly shorter in the direction of motion than a measuring zone in the direction of motion.

14. A travel measuring system as defined by claim 6, in which the measuring coil (40) is markedly shorter in the direction of motion than a measuring zone in the direction of motion.

15. A travel measuring system as defined by claim 7, in which the measuring coil (40) is markedly shorter in the direction of motion than a measuring zone in the direction of motion.

16. A travel measuring system as defined by claim 8, in which the measuring coil (40) is markedly shorter in the direction of motion than a measuring zone in the direction of motion.

17. A travel measuring system as defined by claim 9, in which the measuring coil (40) is markedly shorter in the direction of motion than a measuring zone in the direction of motion.

18. A travel measuring system as defined by claim 2, in which the at least one influencing material (60) having the structure in a direction of motion that represents the control position is disposed on an outer side surface of a substrate material (5).

19. A travel measuring system as defined by claim 18, in which the at least one influencing material (60) having the structure in a direction of motion that represents the control position is disposed on a side (54) of the substrate material (5) remote from the measuring coil (40).

20. A travel measuring system as defined by claim 18, in which the substrate material (5) has an electrical conductivity that is markedly less than the electrical conductivity of the material (60) having the structure in a direction of motion that represents the control position.

21. A travel measuring system as defined by claim 19, in which the substrate material (5) has an electrical conductivity that is markedly less than the electrical conductivity of the material (60) having the structure in a direction of motion that represents the control position.

22. A travel measuring system as defined by claim 18, in which the substrate material (5) has a permeability that is markedly less than the permeability of the material (60) having the structure in a direction of motion that represents the control position.

23. A travel measuring system as defined by claim 19, in which the substrate material (5) has a permeability that is markedly less than the permeability of the material (60) having the structure in a direction of motion that represents the control position.

24. A travel measuring system as defined by claim 20, in which the substrate material (5) has a permeability that is markedly less than the permeability of the material (60) having the structure in a direction of motion that represents the control position.

25. A travel measuring system as defined by claim 2, in which the at least one influencing material (60) having the structure in a direction of motion that represents the control position is subdivided into at least two zones, wherein in one zone an electrical conductivity is markedly greater than in the other zone and a permeability is markedly less than in the other zone.

26. A travel measuring system as defined by claim 2, in which the measuring coil (40) has a core (44, 84), which is provided with a slit (70) that interrupts its circumference.

27. A displacement measuring system as defined by claim 2, in which said displacement is axial displacement in respect to said coil.

28. A displacement measuring system as defined in claim 2, in which said apparatus is a shock absorber in which one of said bodies is a piston and said other body is a cylinder, and said coil is mounted on said piston.

29. A displacement measuring system as defined by claim 2, in which said apparatus is a shock absorber in which one of said bodies is a piston and said other body is a cylinder, and said coil is mounted on said cylinder.

* * * * *